(12) United States Patent
Haney et al.

(10) Patent No.: US 7,913,822 B2
(45) Date of Patent: Mar. 29, 2011

(54) RIDE HEIGHT SENSING SHOCK DAMPER

(75) Inventors: Edward Haney, Gaines, MI (US); Scott A. Bone, Wixom, MI (US); James M. Stevens, Livonia, MI (US); Christopher W. Olsen, Royal Oak, MI (US); Joel Donahue, Novi, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1131 days.

(21) Appl. No.: 11/615,298

(22) Filed: Dec. 22, 2006

(65) Prior Publication Data

US 2008/0148809 A1  Jun. 26, 2008

(51) Int. Cl.
*F16F 9/48* (2006.01)
*G01F 1/24* (2006.01)

(52) U.S. Cl. .............. 188/284; 188/297; 188/266.1; 188/266.15; 188/315; 188/322.19; 73/861.56 MM; 73/305 M; 73/323

(58) Field of Classification Search ............... 188/284, 188/297, 266.1, 266.15, 315, 322.19; 73/861.56, 73/305, 323
See application file for complete search history.

(56) References Cited

U.S. PATENT DOCUMENTS

| | | | |
|---|---|---|---|
| 2,630,193 A * | 3/1953 | Funkhouser | 188/312 |
| 2,714,942 A * | 8/1955 | Funkhouser | 188/315 |
| 3,147,619 A * | 9/1964 | Whitacre | 73/861.56 |
| 4,150,299 A | 4/1979 | Kasiewicz et al. | |
| 4,376,387 A | 3/1983 | Stevens et al. | |
| 4,401,986 A | 8/1983 | Trenkler et al. | |
| 4,635,959 A | 1/1987 | Nakano et al. | |
| 4,674,768 A * | 6/1987 | Morra | 188/266.1 |
| 4,984,820 A | 1/1991 | Uchiyama et al. | |
| 4,989,844 A | 2/1991 | Wijnhoven et al. | |
| 5,015,007 A | 5/1991 | Uchiyama et al. | |
| 5,058,868 A | 10/1991 | Sirven | |
| 5,090,728 A | 2/1992 | Yokoya et al. | |
| 5,134,566 A | 7/1992 | Yokoya et al. | |
| 5,135,203 A | 8/1992 | Wijnhoven et al. | |
| 5,162,996 A | 11/1992 | Matsumoto et al. | |
| 5,168,448 A | 12/1992 | Matsumoto et al. | |
| 5,263,558 A | 11/1993 | Yamaoka | |
| 5,322,320 A | 6/1994 | Sahashi et al. | |
| 5,339,071 A | 8/1994 | Eckhaus | |
| 5,349,863 A | 9/1994 | Dumont et al. | |
| 5,371,598 A | 12/1994 | Ghaem et al. | |
| 5,400,245 A | 3/1995 | Butsuen et al. | |
| 5,522,482 A | 6/1996 | Kashiwagi et al. | |
| 5,555,173 A | 9/1996 | Campbell et al. | |
| 5,572,426 A | 11/1996 | Sasaki et al. | |
| 5,642,043 A | 6/1997 | Ko et al. | |
| 5,802,486 A | 9/1998 | Uchiyama | |
| 6,164,665 A | 12/2000 | Lentz et al. | |
| 6,291,988 B1 | 9/2001 | Hagen et al. | |

(Continued)

*Primary Examiner* — Bradley T King
*Assistant Examiner* — Mahbubur Rashid
(74) *Attorney, Agent, or Firm* — Ralph E. Smith

(57) ABSTRACT

A shock assembly includes a first tube having a cylindrical wall with an inner surface and an outer surface. A second tube is received within the first tube and includes a cylindrical wall having an inner surface and an outer surface. A piston assembly is received within the second tube and includes a piston rod and a piston that is selectively movable relative to the first tube and the second tube. A height-sensing device is disposed within the first tube between the inner surface of the first tube and the outer surface of the second tube.

9 Claims, 4 Drawing Sheets

U.S. PATENT DOCUMENTS

| | | |
|---|---|---|
| 6,356,075 B1 | 3/2002 | Shank |
| 6,732,033 B2 | 5/2004 | LaPlante et al. |
| 6,952,060 B2 | 10/2005 | Goldner et al. |
| 2002/0100649 A1* | 8/2002 | Agrotis et al. ............. 188/266.1 |
| 2002/0144872 A1* | 10/2002 | Gunnar Rothoff ............ 188/315 |
| 2003/0051955 A1* | 3/2003 | Beck ............................. 188/284 |

* cited by examiner

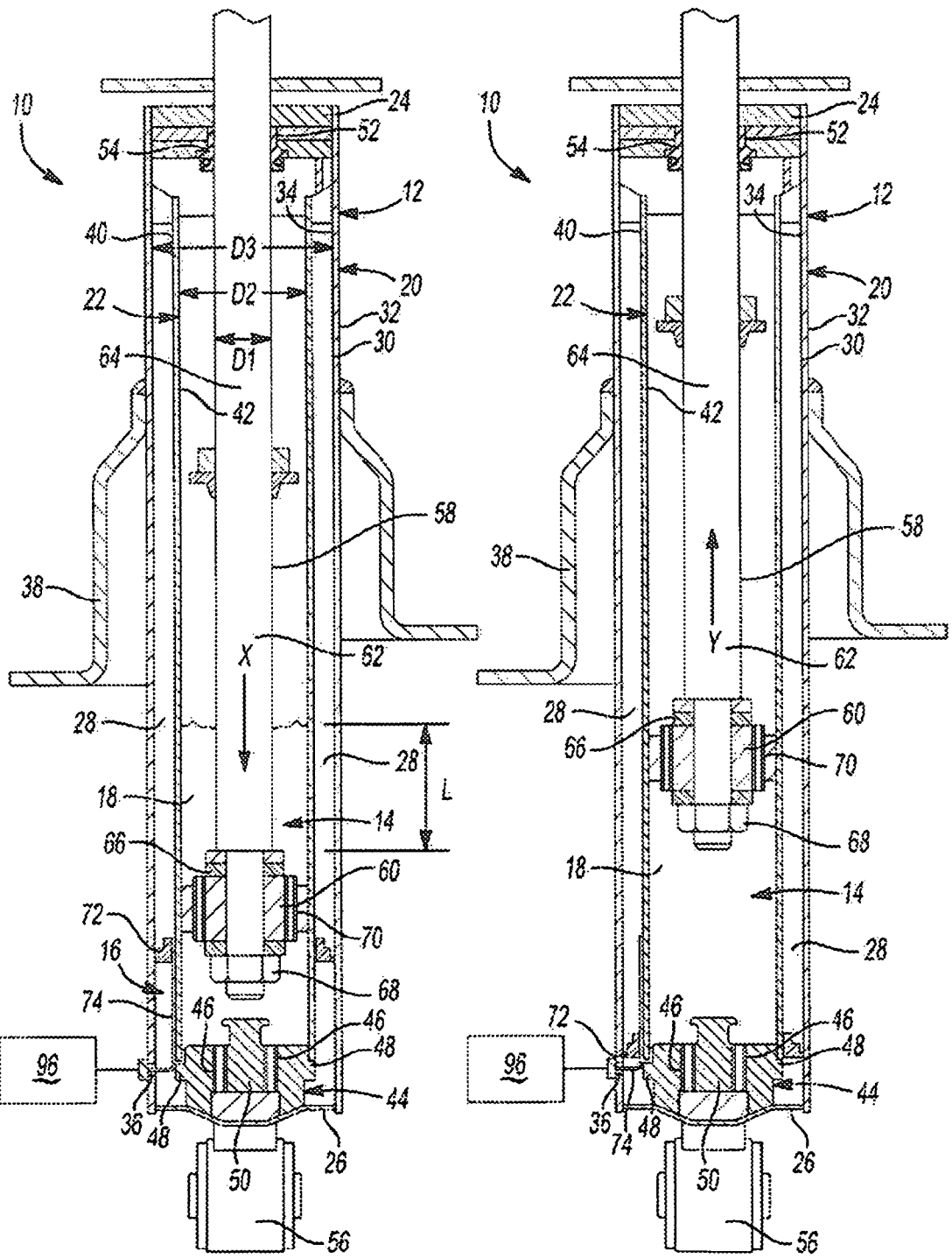

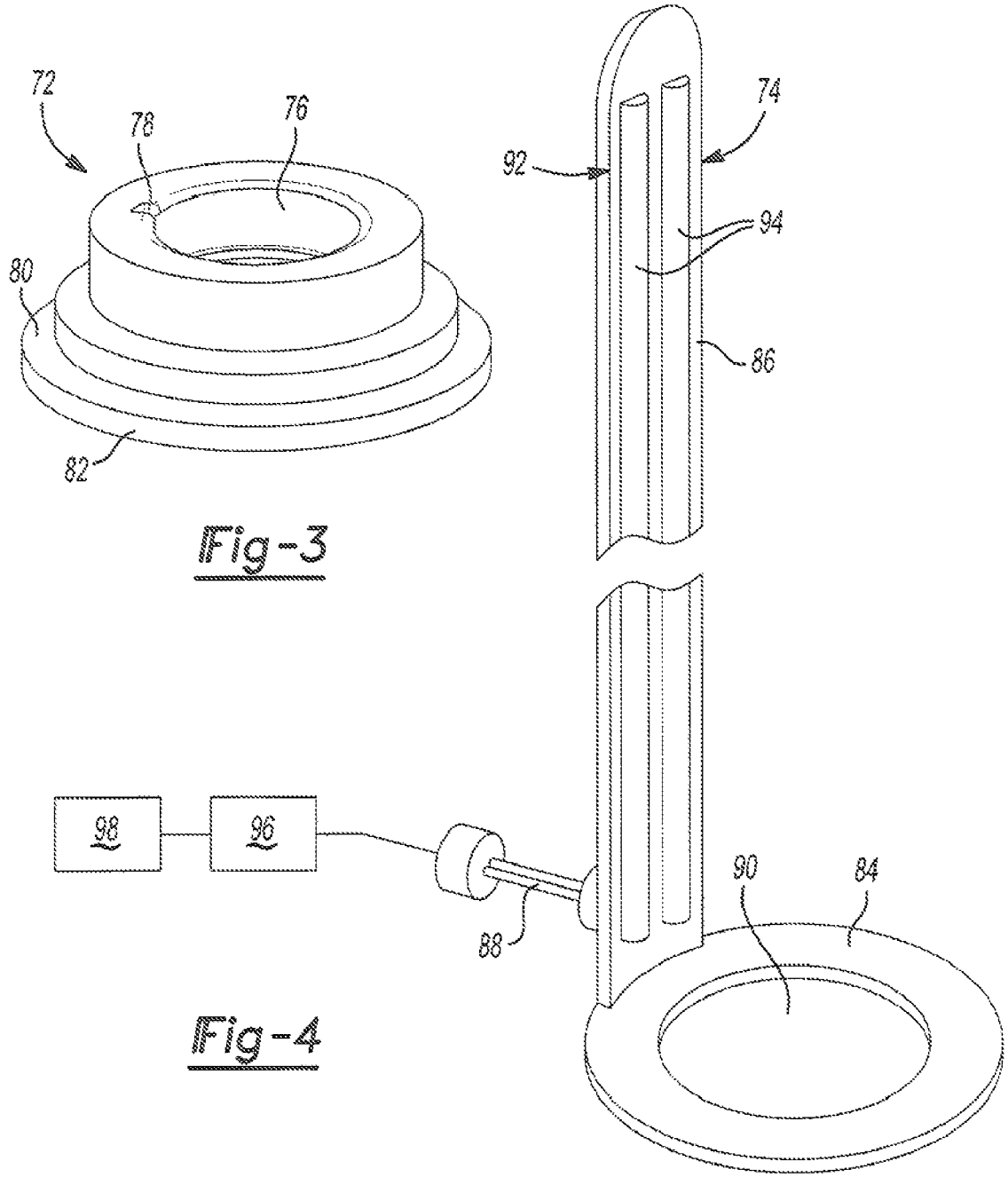

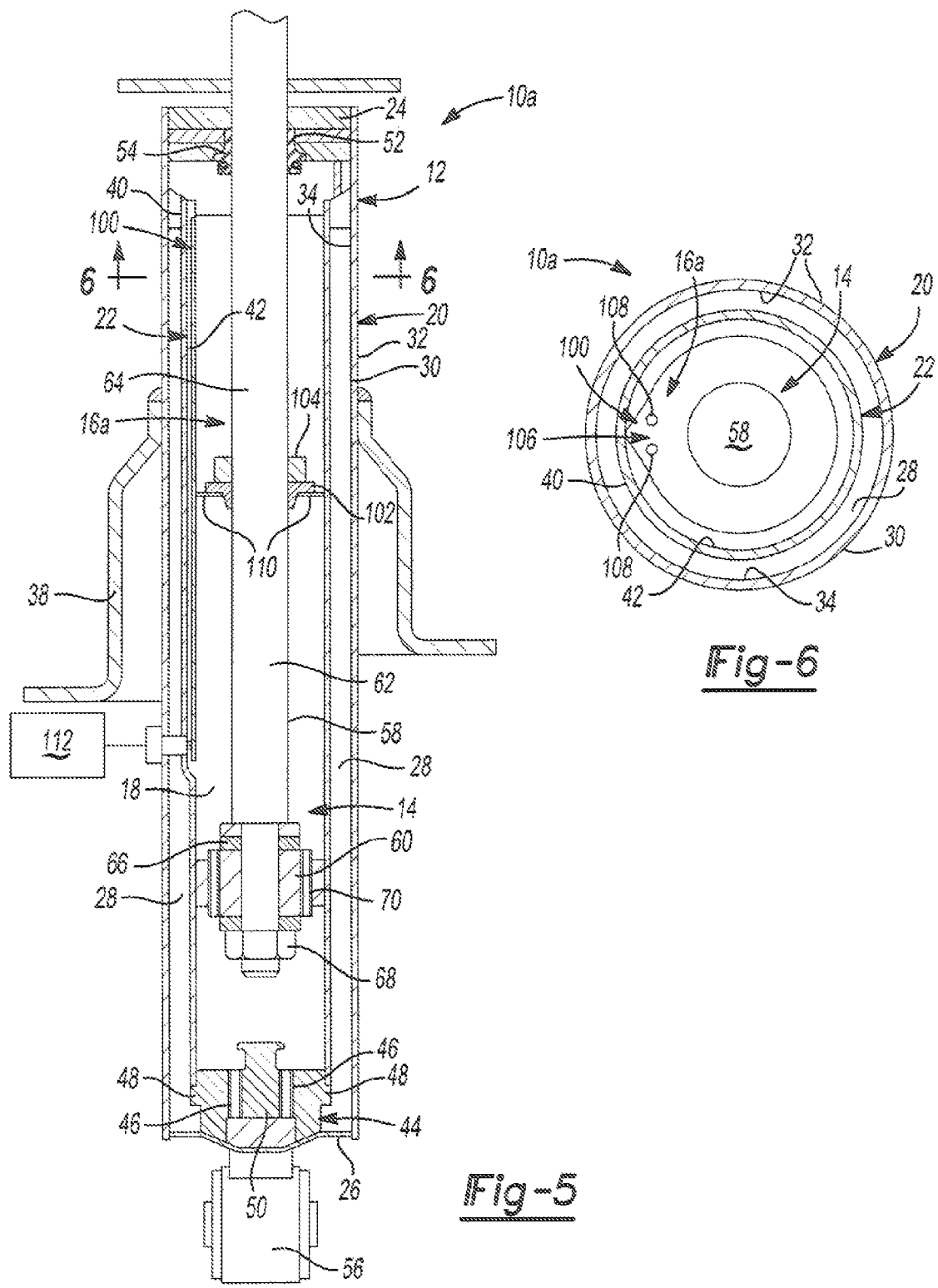

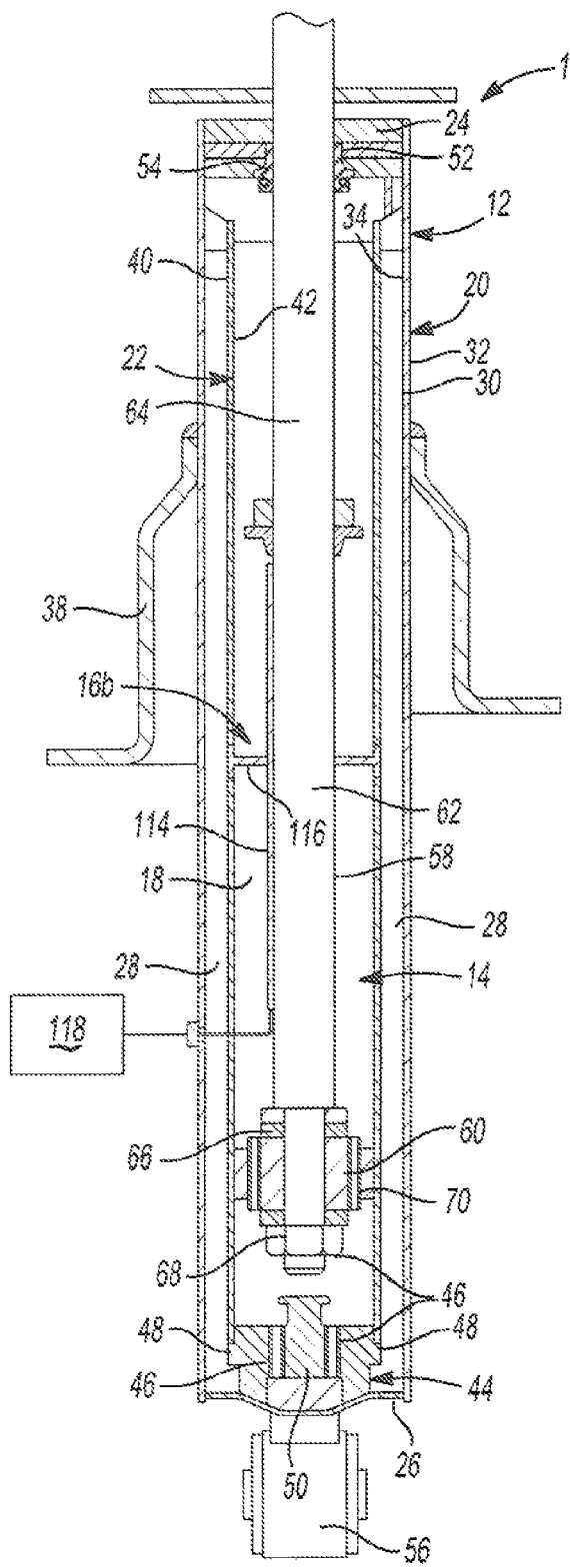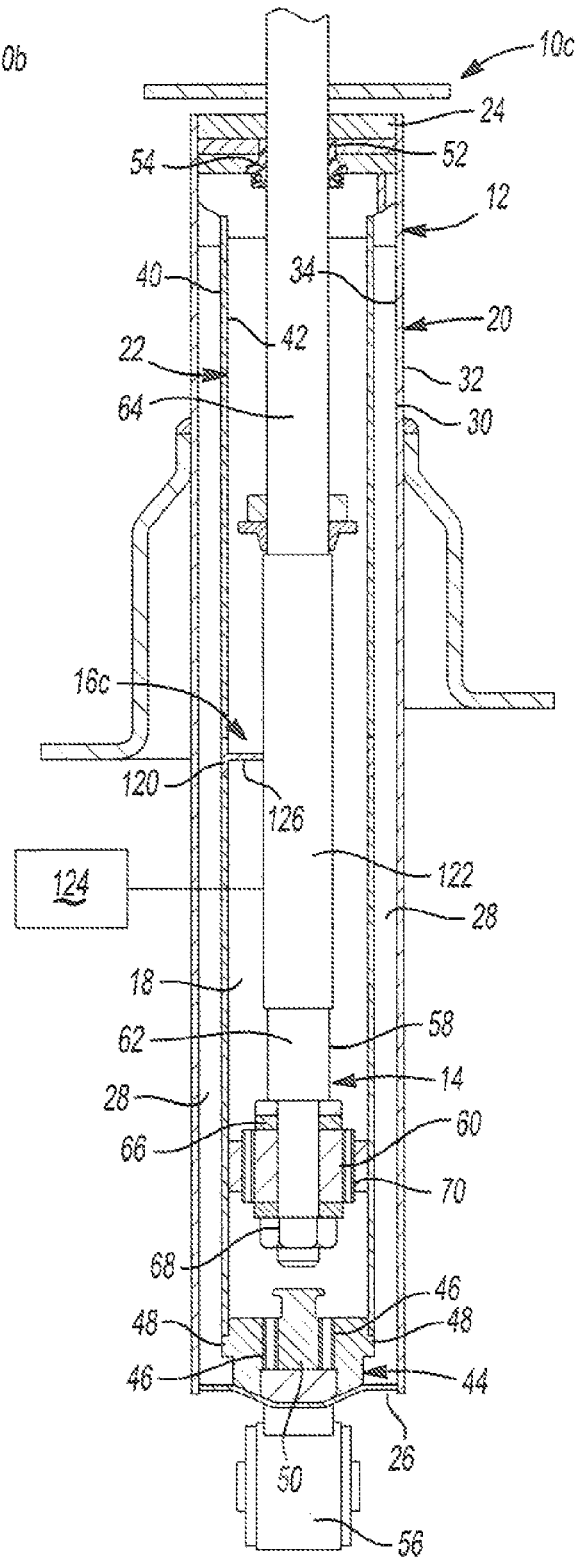

US 7,913,822 B2

RIDE HEIGHT SENSING SHOCK DAMPER

FIELD OF THE INVENTION

The present invention relates to shock assemblies and more particularly to a shock assembly incorporating a height-sensing device.

BACKGROUND OF THE INVENTION

Shock assemblies are conventionally used to cushion the ride of a vehicle to improve the overall comfort of vehicle occupants when traveling over rough and/or uneven road surfaces. Conventional shock assemblies typically include at least one tube having a piston movable therein with a fluid medium disposed generally between the tube and the piston. When the piston is caused to move relative to the tube due to a vehicle moving over rough and/or uneven road surfaces, the fluid medium disposed within the housing dampens movement of the piston relative to the tube and absorbs forces exerted on the vehicle due to the rough and/or uneven road surface.

While conventional shock assemblies adequately absorb forces exerted on a vehicle due to movement over rough and/or uneven road surfaces, conventional shock assemblies do not include a height-sensing device that provides information indicative of a ride height of the vehicle. Such ride-height sensing systems are typically separate from shock assemblies and therefore add to the overall cost and complexity of the vehicle.

SUMMARY OF THE INVENTION

A shock assembly including a first tube having a cylindrical wall including an inner surface and an outer surface. A second tube is received within the first tube and includes a cylindrical wall having an inner surface and an outer surface. A piston assembly is received within the second tube and includes a piston rod and a piston that is selectively movable relative to the first tube and the second tube. A height-sensing device is disposed within the first tube between the inner surface of the first tube and the outer surface of the second tube.

A shock assembly includes a first tube having a cylindrical wall including an inner surface and an outer surface. A second tube is received within the first tube and includes a cylindrical wail having an inner surface and an outer surface. A piston assembly is received within the second tube and includes a piston rod and a piston selectively movable relative to the first tube and the second tube. A height-sensing device is disposed within the first tube and the second tube and includes a variable resistor attached to one of the inner surface of the second tube and the piston rod of the piston assembly and a conductive wiper attached to the other of the inner surface of the second tube and the piston rod of the piston rod assembly.

A method of sensing the position of a piston within a tube of a shock assembly includes applying a force on a piston rod to move the piston rod relative to a first tube and a second tube. The method further includes displacing a predetermined amount of fluid disposed within the first tube and the second tube in response to movement of the piston relative to the first tube and the second tube. The amount of displaced fluid is measured by movement of the piston relative to the first tube and the second tube and generates a signal Indicative of the displaced fluid.

Further areas of applicability of the present invention will become apparent from the detailed description provided hereinafter. It should be understood that the detailed description and specific examples, while indicating the preferred embodiment of the invention, are intended for purposes of Illustration only and are not intended to limit the scope of the invention.

BRIEF DESCRIPTION OF THE DRAWINGS

The present invention will become more fully understood from the detailed description and the accompanying drawings, wherein:

FIG. 1 is a cross-section of a shock assembly in a first position and incorporating a height sensor in accordance with the principles of the present invention;

FIG. 2 is a cross-section of a shock assembly in a second position and incorporating the height sensor of FIG. 2;

FIG. 3 is a perspective view of a float device of the height sensor of FIG. 1;

FIG. 4 is a perspective view of a potentiometer of the height sensor of FIG, 1;

FIG. 5 is a cross-section of a shock assembly incorporating a height sensor in accordance with the principles of the present invention;

FIG. 6 is a cross-section of a shock assembly incorporating a height sensor in accordance with the principles of the present invention;

FIG. 7 is a cross-section of a shock assembly incorporating a height sensor in accordance with the principles of the present invention; and FIG. 8 is a cross-section of a shock assembly incorporating a height sensor in accordance with the principles of the present invention.

DETAILED DESCRIPTION OF THE PREFERRED EMBODIMENTS

The following description of the preferred embodiments) is merely exemplary in nature and is in no way intended to limit the invention, its application, or uses.

With reference to the figures, a shock assembly 10 including a housing 12, a piston assembly 14, and a sensor assembly 16 is provided. The piston assembly 14 is slidably received within and moves relative to the housing 12 to selectively displace a fluid 18 disposed within the housing 12. The sensor assembly 16 is disposed generally within the housing 12 and measures the displacement of the piston assembly 14 relative to the housing 12.

The housing 12 includes an outer tube 20, an inner tube 22, a top cap 24, and a bottom cap 26. The inner tube 22 is received within the outer tube 20 and is fixedly attached thereto. The outer tube 20 is spaced apart from the inner tube 22 such that a gap 28 is created generally between the outer tube 20 and the inner tube 22.

The outer tube 20 includes a cylindrical wall 30 having an outer surface 32 and an inner surface 34. The cylindrical wall 30 may also include an aperture 36 extending therethrough to allow communication between the sensor assembly 16 and an area generally outside of the housing 12. The outer surface 32 may be fixedly attached to a bracket 38 suitable for attaching the shock assembly 10 to an external structure (not shown). The bracket 38 may be welded or otherwise fixedly attached to the outer surface 32 of the outer tube 20 and may be positioned along a length of the cylindrical wall 30.

The inner tube 22 may be fixedly attached to the outer tube 20 by a suitable process such as welding or brazing and includes an outer surface 40 and an inner surface 42. In addition to being fixedly attached to the outer tube 20 via a weld or a braze, the inner tube 22 may also be positioned relative to the outer tube 20 by a cage valve 44 disposed generally proximate to a bottom of the inner tube 22.

The cage valve 44 is disposed adjacent to the bottom cap 26 of the shock assembly 10 and includes a series of apertures 46 and a mounting shoulder 48. The apertures 46 permit communication between fluid 18 disposed within the inner tube 22 and fluid disposed within the gap 28 defined between the outer tube 20 and the inner tube 22. The mounting shoulder 48 extends circumferentially around a body 50 of the cage valve 44 and matingly receives the inner surface 42 of the inner tube 22 to position the inner tube 22 relative to the outer tube 20. While the mounting shoulder 48 is described as receiving the inner surface 42 of the inner tube 22, the mounting shoulder 48 could be formed in the body 50 of the cage valve 44 such that the mounting shoulder 48 engages the outer surface 40 of the inner tube 22 to position the inner tube 22 relative to the outer tube 20.

Cooperation between the weld or braze and the cage valve 44 positions the inner tube 22 relative to the outer tube 20 such that the gap 28 is created between the outer surface 40 of the inner tube 22 and the inner surface 34 of the outer tube 20. The weld or braze and/or cage valve 44 cooperate to ensure that the gap 28 disposed between the outer tube 20 and the inner tube 22 is maintained substantially the same at any circumferential position around the outer tube 20 and inner tube 22 and along a length of the housing 12. In other words, cooperation between the weld or braze and the cage valve 44 ensures that the inner tube 22 is coaxially aligned with the outer tube 20 to maintain a consistent gap 28 between the outer tube 20 and inner tube 22 at any position around the perimeter of the outer tube 20 and inner tube 22 and along the length of the housing 12.

The top cap 24 is matingly received by the outer tube 20 to seal the outer tubs 20 and prevent the fluid 18 from spilling from the outer tube 20. The top cap 24 may be welded or otherwise fixedly attached to the outer tube 20 and includes an aperture 52 formed therein. The aperture 52 matingly receives a seal 54 for interaction with the piston assembly 14.

The bottom cap 26 is disposed on an opposite end of the outer tube 20 from the top cap 24 and includes an outer surface having a generally arcuate shape. The bottom cap 26 is fixedly attached to the outer tube 20 by a weld or other suitable process to prevent the fluid 18 from escaping the outer tube 20. As described above, the cage valve 44 is disposed proximate to the bottom cap 26 for permitting and controlling flow of the fluid 18 between the inner tube 22 and the gap 28 formed between the outer tube 20 and inner tube 22. The cage valve 44 may be attached to the bottom cap 26 or, alternatively, may rest on the bottom cap 26. In either configuration, the cage valve 44 may include a shape that engages the contour of the bottom cap 26 to further position the cage valve 44 relative to the outer tube 20 and inner tube 22. The bottom cap 26 may also include a mounting device 56 for use in attaching the bottom cap 26 and, thus, the shock assembly 10 to an external structure (not shown).

With reference to FIGS. 1 and 2, the piston assembly 14 is shown to include a piston rod 58 and a piston head 60. The piston rod 58 Includes an elongate cylindrical body 62 having an outer surface 64. The cylindrical body 62 is slidably received within the aperture 52 of the top cap 24 such that the outer surface 64 is in slidable and sealing engagement with the seal 54.

The piston head 60 includes a series of disks 66 and a fastener 68. The disks 66 are disposed on a distal end of the cylindrical body 62 of the piston rod 58 and are attached thereto by the fastener 68. The disks 66 are stacked along the cylindrical body 62 and include a series of apertures 70 that permit the fluid 18 to flow through the piston head 60. The disks 66 include a cylindrical shape with at least some of the disks 66 having a sufficient diameter to engage the inner surface 42 of the inner tube 22. Engagement between the disks 66 and the inner surface 42 of the inner tube 22 permits the piston head 60 to move the fluid 18 relative to the outer tube 20 and inner tube 22. Because the disks 66 each include a series of apertures 70, as the piston head 60 is moved relative to the outer tube 20 and inner tube 22, some of the fluid 18 passes through the disks 66 via the apertures 70.

With particular reference to FIGS. 1-4, the sensor assembly 16 is shown to include a float 72 and a potentiometer 74 that cooperate to measure a position of the piston head 60 relative to the outer tube 20 and inner tube 22. The float 72 is a cylindrical member made of a conductive material or having a portion thereof formed of a conductive material and is slidably received within the gap 28 formed between the outer tube 20 and the inner tube 22. The float 72 includes a central aperture 76 that slidably receives the piston rod 58. The central aperture 76 may include a notch 78 for radially positioning the float 72 relative to the piston rod 58 when the float 72 is assembled to the piston rod 58. While the float 72 may be made from a conductive material such as steel, the float 72 could be made from a non-conductive material with an outermost portion thereof formed of a conductive material. For example, if the float 72 includes a stepped configuration, as shown in FIG. 3, the outermost step 80 would be formed of a conductive material such that a surface 82 of the step 80 includes a conductive material.

The potentiometer 74 includes a circular base 84, an upstanding arm 86, and a wire harness 88. The circular base 84 is positioned substantially perpendicular to the upstanding arm 86 and is positioned proximate to the bottom cap 26 of the housing 12. The circular base 84 may include an aperture 90 that matingly receives a bottom portion or a top portion of the cage valve 44 to position the upstanding arm 86 relative to the outer tube 20 and inner tube 22. In either configuration, cooperation between the circular base 84 and/or the cage valve 44 positions the circular base 84 and, thus, the upstanding arm 86 of the potentiometer 74 relative to the outer tube 20 and inner tube 22.

The upstanding arm 86 may be integrally formed with the circular base 84 and includes a conductive portion 92 in electrical communication with the wire harness 88. In one configuration, the conductive portion 92 includes a pair of wires 94 that are coupled to or extend from the wire harness 88 and may be molded integrally with the upstanding arm 86.

Once assembled to the housing 12, the upstanding arm 86 of the potentiometer 74 extends into the gap 28 proximate to either the outer tube 20 or inner tube 22 for interaction with the float 72. The wire harness 88 may be routed through the cylindrical wail 30 of the outer tube 20 at the aperture 36 to allow communication between the potentiometer 74 and a control device 96.

In operation, an electrical current (i.e., a voltage) may be applied to the conductive portion 92 of the potentiometer 74 to energize the wires 94. Because surface 82 of the float 72 is in electrical contact with the conductive portion 92 of the potentiometer 74, movement of the float 72 relative to the potentiometer 74 varies the resistance along a length of the potentiometer 74. Therefore, because the input voltage (i.e., the supplied voltage via the wire harness 88) is known, the position of the float 72 relative to the potentiometer 74 may be determined by the control module 96 by determining the voltage at a particular resistance. As will be described in detail below, movement of the float 72 relative to the potentiometer 74 and, thus, relative to the outer tube 20 and Inner tube 22, provides an indication as to the overall stroke of the piston head 60 relative to the outer tube 20 and inner tube 22. While a potentiometer 74 is disclosed, any device that interacts with the float 72 to provide information indicative of the position of the float 72 relative to the outer tube 20 and inner tube 22 such as a variable resistor may be used.

With particular reference to FIGS. 1 and 2, operation of the shock assembly 10 will be described in detail. As shown in FIG. 1, when the piston head 60 is moved relative to the outer tube 20 and inner tube 22 and in the X direction, the piston head 50 is positioned proximate to the cage valve 44. Movement of the piston head 60 in the X direction displaces the fluid 18 disposed between the piston head 60 and the cage valve 44. The displaced fluid 18 travels through the cage valve 44 via apertures 46 and into the gap 28. While some of the fluid 18 travels through the cage valve 44, some of the fluid also travels through the piston head 60 via apertures 70 and into an area generally between the piston head 60 and the top cap 24.

The displaced fluid 18 in the gap 28 applies a force to the float 72 and causes the float 72 to move along the potentiometer 74. As described above, movement of the float 72 within the gap 28 and relative to the potentiometer 74 varies the resistance of the potentiometer 74 as the float 72 is moved relative thereto. Because the voltage supplied to the potentiometer 74 is a known constant, the control device 76 may determine the position of the float 72 relative to the potentiometer 74. The control device 96 may then correlate the position of the float 72 relative to the potentiometer 74 and determine the overall movement of the piston head 60 in the X direction relative to the outer tube 20 and inner tube 22.

Movement of the float 72 relative to the potentiometer 74 in response to movement of the piston head 60 in the X direction will cause a known amount of fluid 18 to travel through the piston head 60 via apertures 70 and collect in an area of the inner tube 22 between the piston head 60 and the top cap 24. The control device 96 may use the position of the float 72 relative to the potentiometer 74 to determine the amount of displaced fluid 18 in the gap 28 as well as the amount of displaced fluid 18 in the area of the piston head 60 and below the fop cap 24.

The control device 96 may be programmed with the diameter (D1) of the piston rod 58, the diameter (D2) of the inner tube 22 as measured from the outer surfaces 40 of the inner tube 22, and the diameter (D3) of the outer tube 20 as measured between the inner surfaces 34 of the outer tube 20. The above three diameters, in combination with the known position of the float 72 relative to the potentiometer 74, allows the control device 96 to calculate the position of the piston head 60 relative to the outer tube 20 and inner tube 22.

For example, if the diameter of the piston rod 58 (D1) is 14 mm, the outer diameter of the inner tube 22 (D2) is 40 mm, and the inner diameter of the outer tube 20 (D3) is 48 mm, a volume ratio R can be determined by the following relationship;

$$R=(D_3^2-D_2^2)/D_1^2$$

Using the above equation yields a volume ratio of 3.59, which can be used in conjunction with information from the potentiometer 74 to determine movement of the piston 60 relative to the outer tube 20 and inner tube 22.

A portion of the shock rod 58 generally above the piston 60 and below the top cap 24 is submerged in the fluid 18. The portion of the shock rod 58 under the fluid 18 is represented by L (FIG. 1) and can be used in conjunction with R to determine a height H of the float 72 (i.e., the position of the float 72) relative to the outer tube 20 and inner tube 22 using the following relationship:

$$H=R*L$$

The above equation yields a height of 359 mm, which can be used in conjunction with a volumetric displacement of fluid 18 caused by movement of the piston 60 relative to the outer tube 20 and inner tube 22 to determine the overall movement of the piston rod 58 and piston 60 relative to the outer tube 20 and inner tube 22.

The volumetric displacement of fluid 18 can be determined using using the following relationship:

$$V_d=(\pi/4)*(D_1^2)*L$$

The above equation yields a volumetric displacement of fluid for the above example equal to 15393 mm$^2$. If a nominal position of the piston rod 58 and piston 60 relative to the outer tube 20 and inner tube 22 are known, the above volumetric displacement and height of the float 72 may be used to determine how much the piston rod 58 and piston 60 have moved relative to the outer tube 20 and inner tube 22.

When the piston head 60 is moved in the Y direction such that the piston head 60 is moved away from the cage valve 44, the fluid 18 is once again displaced. The fluid 18 disposed within the gap 28 between the outer tube 20 and inner tube 22 moves from the gap 28 and travels through the cage valve 44 and into the inner tube 22 between the cage valve 44 and the piston head 60. Similarly, the fluid 18 disposed between the piston head 60 and the top cap 24 also travels into the space between the cage valve 44 and the piston head 60 via the apertures 70 formed in the piston head 60. As described above with relation to movement of the piston head 60 in the X direction, the control device 96 may similarly determine the position of the piston head 60 in the Y direction through similar calculations using the respective diameters (D1, D2, D3.) as well as the position of the float 72 relative to the potentiometer 74.

As described, the sensor assembly 16 is disposed generally within the housing 12 and provides an indication as to the overall travel of the piston head 60 relative to the outer tube 20 and the inner tube 22. The positional information of the piston head 60 relative to the outer tube 20 and inner tube 22 may be determined by the control device 96 interacting with the sensor assembly 16 via the wire harness 88. The control device 96 may determine the position of the piston head 60 relative to the outer tube 20 and inner tube 22 to determine the overall movement of the piston head 60 relative to the housing 12.

Determining the overall movement of the piston head 60 relative to the housing 12 provides an indication of the overall movement of the piston rod 58 relative to the housing 12. This information may be used to determine the relative position between components to which the piston rod 58 and housing 12 are respectively attached.

In one configuration, the mounting device 56 of the housing 12 may be attached to a suspension component of a vehicle (not shown) while the piston rod 58 is attached to an underbody structure of the vehicle (neither shown). While the mounting device 56 is described as being attached to a suspension member of a vehicle and the piston rod 58 is described as being attached to an undersurface of a vehicle, the mounting device 56 could alternatively be attached to the undersurface of the vehicle while the piston rod 58 could alternatively be attached to the suspension system.

During movement of the vehicle, the suspension system is caused to move relative to the undersurface of the vehicle body. Such movement imparts a force on the piston rod 58 and causes the piston rod 58 and, thus, the piston head 60 to move relative to the housing 12. As described above, movement of the piston head 60 relative to the housing 12 displaces the fluid 18 disposed within the housing 12. Displacement of the fluid 18 within the housing 12 dampens the movement of the piston head 60 relative to the housing 12 to slow down and control movement of the piston head 60 and, thus, the piston rod 58 relative to the housing 12. Controlling movement of the piston rod 58 and piston head 60 relative to the housing 12 indirectly controls movement of the suspension system relative to the vehicle and may therefore be used to adjust and tune the overall ride of the vehicle.

As described above, the sensor assembly 16 provides an indication of the piston rod 58 and piston head 60 relative to the housing 12. This information may be used by the control device 96 to determine a position of the suspension system relative to the undersurface of the vehicle. Calculating the position of the suspension system relative to the vehicle allows the control device 96 to determine the overall height of the vehicle, which may be used by the control device 96 or another controller such as a body controller 98 to determine the overall height of the vehicle relative to the suspension system and/or ground.

The body controller 98 may use such information in conjunction with a vehicle subsystem such as, for example, an air-suspension system or a headlight-aiming system (neither shown), integrating the sensor assembly 16 into the shock assembly 10 reduces the need for further sensors disposed within and around the vehicle and within and around the suspension system to provide a controller such as the body controller 98 with information indicative of the overall vehicle height and/or the position of the vehicle relative to the suspension system. Therefore, the sensor assembly 16 reduces costs by minimizing the number of sensors and reduces manufacturing complexity by incorporating the sensor assembly 16 into the shock assembly 10.

With reference to FIGS. 6 and 6, a shock assembly 10a is provided. In view of the substantial similarity and structured function of the components associated with the shock assembly 10 with respect to the shock assembly 10a, like reference numerals are used hereinafter and in the drawings to identify like components while like reference numerals containing letter extensions are used to identify those components that have been modified.

The shock assembly 10a includes a sensor assembly 16a disposed within the inner tube 22. The sensor assembly 16a includes a variable resistor 100, a wiper 102, and a fitting 104. The variable resistor 100 includes a pair of conductive elements 106 such as wires 108 and is fixedly attached to the inner surface 42 of the inner tube 22. The wiper 102 is fixedly attached to and axially surrounds the piston rod 58 and includes a conductive portion 110. The conductive portion 110 is in contact with the conductive elements 106 of the variable resistor 100. The wires 108 are electrically connected to the conductive elements 106 and extend through the outer tube 20 and inner tube 22 for communication with a control device 112.

In operation, the control device 112 supplies a constant voltage to the variable resistor 100 via the wires 108. The wiper 102 is in contact with the variable resistor 100 and makes an electrical connection with the variable resistor 100 via the conductive portion 110. During movement of the piston rod 58 relative to the housing 12, the wiper 102 moves relative to the variable resistor 100. Movement of the wiper 102 relative to the variable resistor 100 supplies a signal to the control device 112. Based on the signal received, the control device 112 may determine the position of the piston rod 58 relative to the housing 12. As described above with respect to the shock assembly 10, determining the position of the piston rod 58 relative to the housing 12 may be useful in determining the overall height of s vehicle relative to a suspension system and/or ground and may therefore be used in conjunction with a vehicle subsystem such as an air-suspension system or a headlight-aiming system, With regard to FIG, 7, a shock assembly 10b is provided, in view of the substantial similarity in structure and function of the components associated with the shock assembly 10 with respect to the shock assembly 10b, like reference numerals are used hereinafter and in the drawings to identify like components while like reference numerals containing letter extensions are used to identify those components that have been modified.

The shock assembly 10b includes a sensor assembly 16b disposed within the inner tube 22. The sensor assembly 16b includes a variable resistor 114 attached to and movable with the piston rod 58, a wiper 116 attached to the inner surface 42 of the inner tube 22, and a control module 118 in communication with the variable resistor 114.

During operation, when the piston rod 58 translates relative to the housing 12, the wiper 116 moves relative to and along the variable resistor 114. As with the shock assembly 10a, movement of the wiper 116 relative to the variable resistor 114 produces a signal that is sent to the control module 118. The control module 118 may use the signal to determine the position of the piston rod 58 relative to the housing 12, which then may be used by the control module 118 for determining the relative position of a vehicle relative to a suspension system and/or ground. Such information may be used by the control module 118 or the body controller 98 to control vehicle subsystems such as air-suspension systems and/or headlight-aiming systems.

With particular reference to FIG, 8, a shock assembly 10c is provided, in view of the substantial similarity in structure and function of the components associated with the shock assembly 10 with respect to the shock assembly 10c, like reference numerals are used hereinafter in the drawings to identify like components while like reference numerals containing letter extensions are used to identify those components that have been modified, The sensor assembly 16c includes a wiper 120 fixedly attached to the inner surface 42 of the inner tube 22, a coil-wound rod 122 axially surrounding an outer surface of the piston rod 58, and a control module 124 in communication with the wiper 120. The wiper 120 includes a conductive portion 126 in contact with the coil of the coil-wound rod 122. The coil-wound rod 122 is attached to and axially surrounds the piston rod 58 such that the coil-wound rod 122 is movable with the piston rod 58. The coil-wound rod 122 is electrically connected to the control module 124 and receives a voltage from the control module 124.

In operation, the voltage received by the coil-wound rod 122 from the control module 124 energizes the coil-wound rod 122 with a constant voltage. When the piston rod 58 and, thus, the coil-wound rod 122 are moved relative to the housing 12, the conductive portion 126 is moved along the coil-wound rod 122 as the coil-wound rod 122 and piston rod 58 are moved relative to the housing 12. Relative movement between the wiper 120 and the coil-wound rod 122 supplies a signal to the control module 124. The control module 124 may use the supplied signal to determine the position of the piston rod 58 relative to the housing 12. As described above with respect to the shock assemblies 10, 10a, 10b, the control module 124 may use the position of the piston rod 58 relative to the housing 12 to determine a position of a vehicle relative to a suspension system and/or ground. Such information may be used by the control module 124 and/or the body controller 08 in conjunction with a vehicle subsystem such as an air-suspension system or a headlight-aiming system.

As described, the shock assemblies 10, 10a, 10b, 10c respectively incorporate sensor assemblies 16, 16a, 16b, 16c within the housing 12 of the respective shock assemblies 10, 10a, 10b, 10c. Positioning the sensor assemblies 16, 16a, 16b, 16c within the housing 12 obviates the need for additional sensors to be placed on the vehicle or suspension system to provide the body controller 98 with an indication of the overall height of the vehicle and the position of the vehicle relative to the suspension system and/or ground.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A shock assembly comprising:
   a first tube including a cylindrical wall having an inner surface and an outer surface;
   a second tube received within said first tube and including a cylindrical wall having an inner surface and an outer surface;
   a piston assembly received within said second tube and including a piston rod and a piston that is selectively movable relative to said first tube and said second tube; and
   a height-sensing device including a potentiometer disposed on one of said inner surface of said first tube or said outer surface of said second tube and a member selectively movable relative to said first tube and said second tube in response to movement of said piston assembly relative to said first tube and said second tube.

2. The shock assembly of claim 1, wherein said height-sensing device includes said member disposed between said inner surface of said first tube and said outer surface of said second tube that is responsive to movement of said piston assembly relative to said first tube and said second tube.

3. The shock assembly of claim 2, wherein said member is a float in contact with fluid disposed within said first tube and said second tube, said float being moved relative to said first tube and said second tube when said piston assembly is moved relative to said first tube and said second tube.

4. The shock assembly of Claim 2, wherein said member includes a metallic portion in contact with said potentiometer.

5. The shock assembly of Claim 1, wherein said potentiometer is connected to a power source that selectively supplies power to said potentiometer.

6. The shock assembly of Claim 2, wherein movement of said member relative to said potentiometer produces a signal indicative of a position of said piston assembly relative to said first tube and said second tube.

7. method of sensing the position of a piston within a tube of a shock assembly, the method comprising:
   applying a force on a piston rod to move said piston rod relative to a first tube and a second tube;
   displacing a predetermined amount of fluid disposed within said first tube and said second tube in response to movement of said piston relative to said first tube and said second tube;
   causing movement of a float device relative to a potentiometer disposed between said first tube and said second tube under force of said displaced fluid:
   measuring the amount of displaced fluid caused by movement of said piston relative to said first tube and said second tube based on a position of said float device relative to said potentiometer; and
   generating a signal indicative of said displaced fluid.

8. The method of claim 7, further comprising calculating a travel of said piston relative to said first tube and said second tube based on said signal.

9. The method of claim 7, wherein said determining said amount of displaced fluid includes measuring an amount of said fluid disposed between said first tube and said second tube.

* * * * *